(12) United States Patent
Menheere et al.

(10) Patent No.: US 11,268,405 B2
(45) Date of Patent: Mar. 8, 2022

(54) BEARING SUPPORT STRUCTURE WITH VARIABLE STIFFNESS

(71) Applicant: PRATT & WHITNEY CANADA CORP., Longueuil (CA)

(72) Inventors: David Menheere, Norval (CA); Richard Kostka, Bolton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 58 days.

(21) Appl. No.: 16/809,069

(22) Filed: Mar. 4, 2020

(65) Prior Publication Data

US 2021/0277799 A1 Sep. 9, 2021

(51) Int. Cl.
*F01D 25/16* (2006.01)
*F16C 35/06* (2006.01)

(52) U.S. Cl.
CPC ............ *F01D 25/164* (2013.01); *F16C 35/06* (2013.01); *F05D 2220/32* (2013.01); *F05D 2230/232* (2013.01); *F05D 2240/54* (2013.01); *F05D 2260/96* (2013.01); *F16C 2360/23* (2013.01)

(58) Field of Classification Search
CPC ....... F01D 25/162; F01D 25/164; F16C 35/06
See application file for complete search history.

(56) References Cited

U.S. PATENT DOCUMENTS

| 3,318,572 | A | * | 5/1967 | Scaizo | F01D 25/162 415/134 |
| 5,080,555 | A | * | 1/1992 | Kempinger | F01D 9/065 415/108 |
| 6,846,158 | B2 | | 1/2005 | Hull | |
| 7,524,112 | B2 | | 4/2009 | Gerez et al. | |
| 8,347,635 | B2 | | 1/2013 | Durocher et al. | |
| 2013/0280063 | A1 | * | 10/2013 | Ganiger | F16C 27/04 415/229 |
| 2015/0000306 | A1 | * | 1/2015 | Perronnet | F01D 25/162 60/796 |
| 2015/0247458 | A1 | | 9/2015 | Scott et al. | |
| 2018/0298822 | A1 | | 10/2018 | Ac et al. | |
| 2019/0353052 | A1 | | 11/2019 | Ganiger et al. | |
| 2020/0080435 | A1 | * | 3/2020 | Durocher | F01D 9/065 |

* cited by examiner

*Primary Examiner* — Topaz L. Elliott
(74) *Attorney, Agent, or Firm* — Norton Rose Fulbright Canada LLP

(57) ABSTRACT

A method of manufacturing a bearing support structure of a gas turbine engine, includes: obtaining a bearing support and a casing assembly, the casing assembly having first and second casings extending around a central axis and connected together via struts, the bearing support securable to the first casing at attachment points; selecting a distance between the attachment points of the bearing support and the struts as a function of a required stiffness of the bearing support structure; and adjusting a position of the bearing support relative to the casing assembly until the attachment points are distanced from the struts by the selected distance and joining the bearing support to the casing assembly at the attachment points.

11 Claims, 2 Drawing Sheets

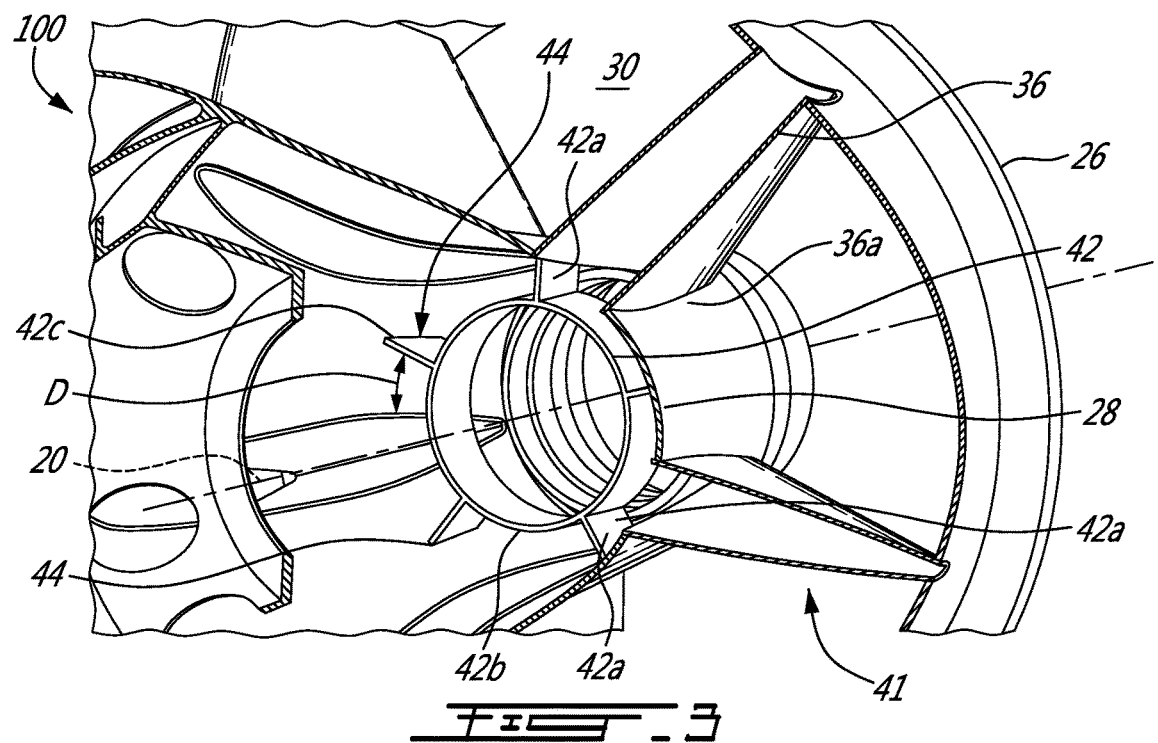
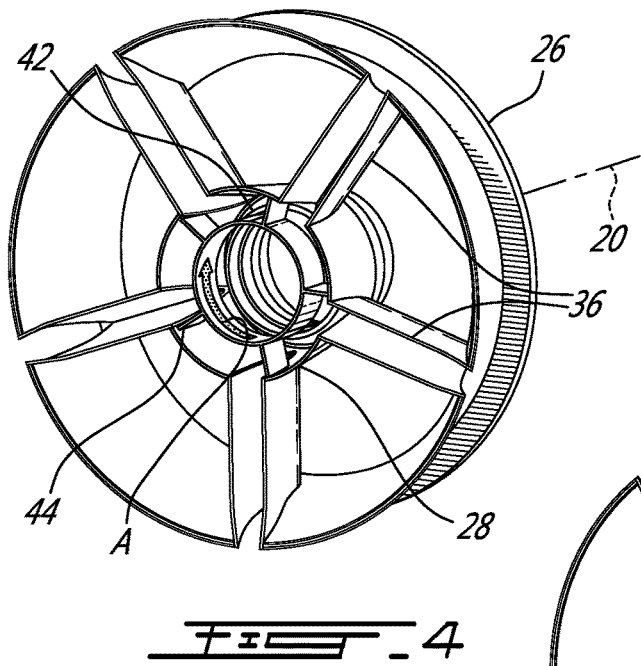
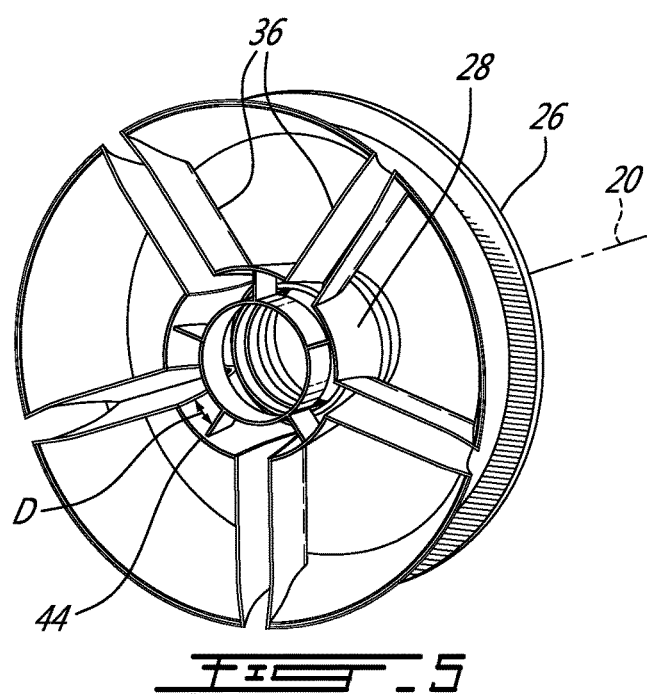

BEARING SUPPORT STRUCTURE WITH VARIABLE STIFFNESS

TECHNICAL FIELD

The application relates generally to gas turbine engines and, more particularly, to case assemblies comprising bearings for supporting rotors used in such engines.

BACKGROUND OF THE ART

In a gas turbine engine, rotors including shafts, compressor/fan and/or turbine blades are rotatably mounted within a casing via bearings. The bearings are typically located radially inwards relative to the annular flow path formed by duct walls of the casing. A bearing housing usually encloses the bearings and defines a bearing cavity for receiving lubricant for lubricating the bearings. Due to the forces inherent to gas turbine engine operation, and as they are the interface between shafts and a support structure, the bearings are exposed to loads, vibrations, etc.

SUMMARY

In one aspect, there is provided a method of manufacturing a bearing support structure of a gas turbine engine, comprising: obtaining a bearing support and a casing assembly, the casing assembly having first and second casings extending around a central axis and connected together via struts, the bearing support securable to the first casing at attachment points; selecting a distance between the attachment points of the bearing support and the struts as a function of a required stiffness of the bearing support structure; and adjusting a position of the bearing support relative to the casing assembly until the attachment points are distanced from the struts by the selected distance and joining the bearing support to the casing assembly at the attachment points.

In another aspect, there is provided a method of adjusting a stiffness of a bearing support structure of a gas turbine engine, the bearing support having first and second casings extending around a central axis and connected together via struts and having a bearing support securable to the first casing at attachment points, comprising: obtaining operating parameters of the gas turbine engine; determining a required stiffness of the bearing support structure as a function of the obtained parameters; and selecting a distance between the attachment points of the bearing support and the struts as a function of the determined required stiffness and joining the bearing support to the first casing at the attachment points.

In yet another aspect, there is provided a bearing support structure for a gas turbine engine, the bearing support structure having a central axis and comprising: first and second casings extending around the central axis and being radially spaced apart from one another relative to the central axis, the first and second casings secured to one another by struts extending at least radially; and a bearing support secured to the first casing at attachment points circumferentially distributed around the central axis, the bearing support free of contact with the first casing between the attachment points.

DESCRIPTION OF THE DRAWINGS

Reference is now made to the accompanying figures in which:

FIG. 3 is a schematic partially cutaway view of the bearing support structure of FIG. 2;

FIG. 4 is a schematic cross-sectional view of the bearing support structure of FIG. 2 shown in a first position; and FIG. 5 is a schematic cross-sectional view of the bearing support structure of FIG. 2 show in a second position.

DETAILED DESCRIPTION

Figure 1:
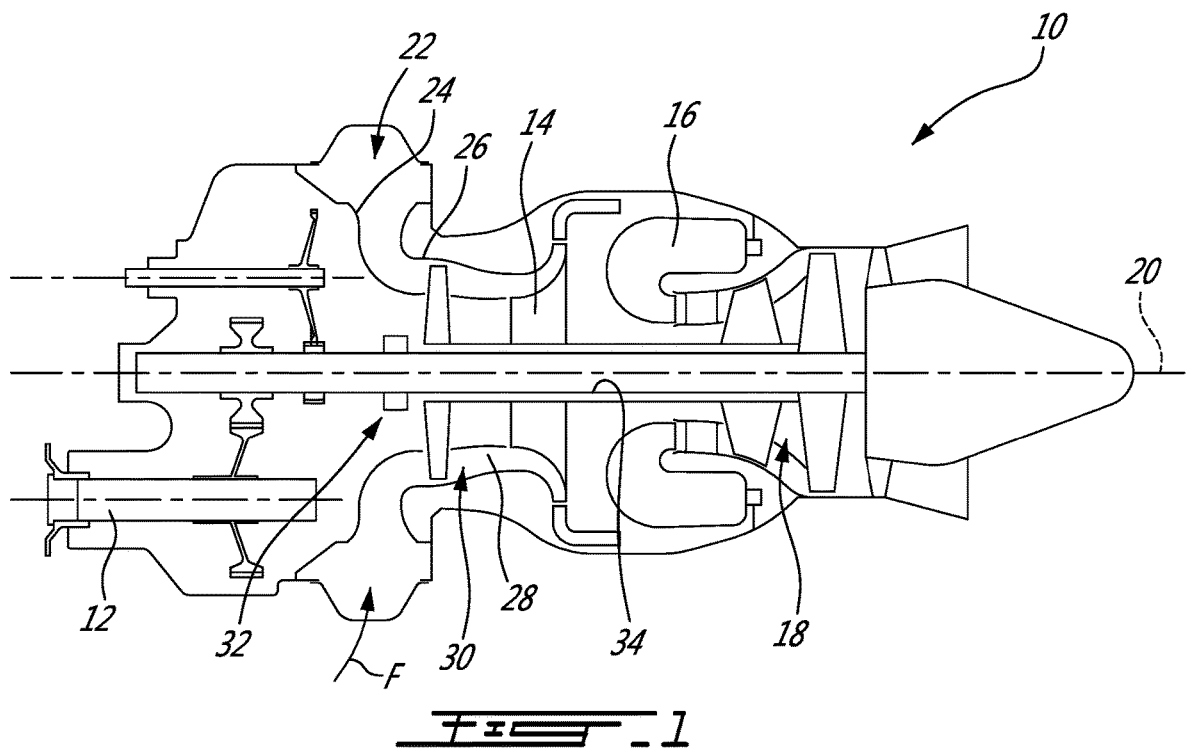
FIG. 1 is a schematic cross sectional view of a gas turbine engine.

FIG. 1 illustrates a gas turbine engine 10 of a turboshaft type preferably provided for use in subsonic flight, generally comprising a shaft 12 for driving a load, such as a helicopter rotor. The engine 10 includes, in serial flow communication, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 and the turbine section 18 are rotatable about a central axis 18.

As shown in FIG. 1, an inlet 22 of the engine 10 may be aligned in a substantially radial direction relative to the central axis 20. The engine 10 may have an air intake 24 configured to redirect a direction of an incoming flow F from a substantially radial direction to a substantially axial direction before it is injected into the compressor section 14.

The engine 10 may include one or more outer casings 26 and one or more inner casings 28 located radially inwardly of the outer casings 26 relative of the central axis 20. These casings 26, 28 may define a gaspath 30 therebetween. Bearings 32 (only one shown herein) may be located radially inwardly of the inner casings 28 for rotatably supporting one or more shafts 34 of the engine 10. The inner and outer casings 28, 26 may be secured to one another via struts 36 (FIG. 2) and may transmit loads from the shaft 34 to the outer casing 26. In some cases, the inner and outer casings 28, 26 and the struts 36, further to define the gaspath 30 therebetween, may act as a bearing support structure rotatably support the bearings 32.

Figure 2:
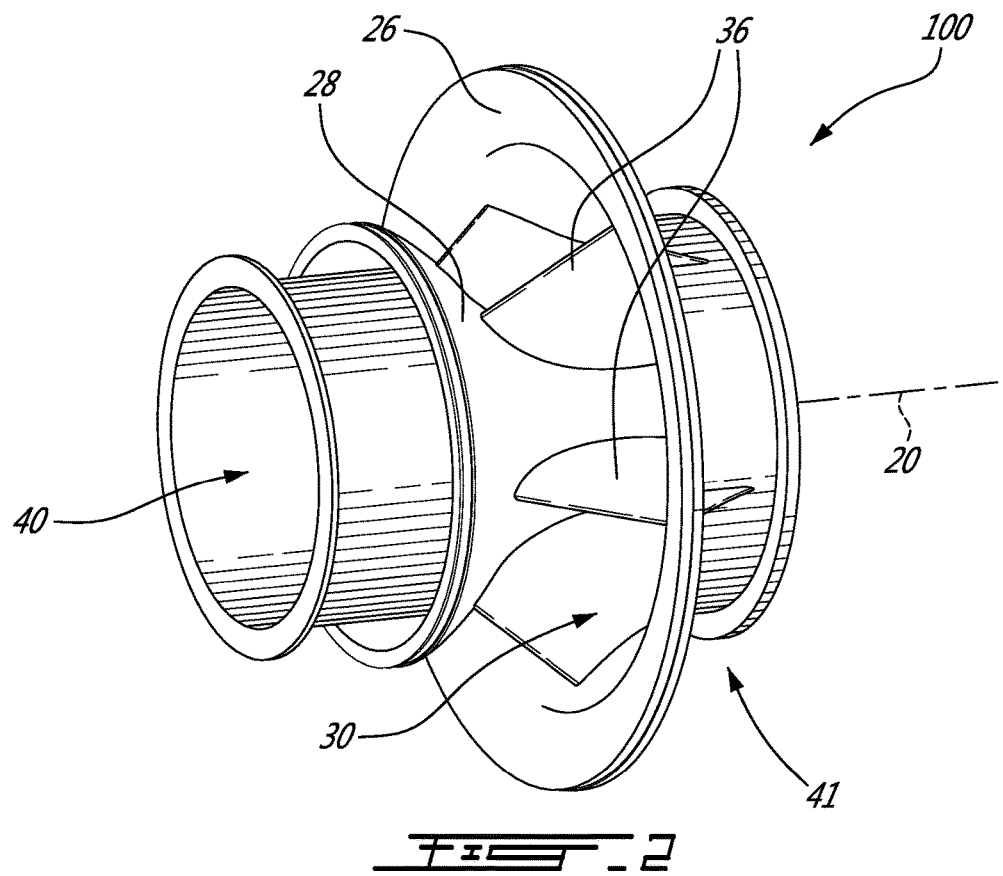
FIG. 2 is a schematic three-dimensional view of a bearing support structure that may be used with the gas turbine engine of FIG. 1.

Referring now to FIGS. 1-2, the outer and inner casings 26, 28 and the struts 36 are part of a bearing support structure 100 that may be located proximate the inlet 22 of the gas turbine engine 10. The structure 100 defines a hollow portion 40 for receiving the shafts 34 and bearings 32. It will be appreciated that, although the bearing support structure 100 is being described as a part of the engine 10 located upstream of the compressor section 16 and that defines a portion of the gaspath 30 of the engine 10, the same principles as will be described herein below may be applied to any structure supporting one or more bearings of a gas turbine engine. The casings may define annular flanges for securement to adjacent components (e.g., other casings) of the engine 10.

Bearing support structures may be designed and manufactured as a function of operating parameters of the gas turbine engine. In some cases, more stiffness is required in the engine and engineers may cater to this stiffness requirement by thickening sheet metal surfaces composing the structure, changing geometry of parts of the structure, or completely redesigning the structure. This may be time consuming.

In the embodiment shown, the bearing housing, which may correspond to the inner casing 28, may be constructed from multiple pieces of formed or shaped metal sheet or machined parts that may be welded together to form a bearing housing which may support the bearing 32 and the shaft 34 combination. The bearing housing may be constructed in such a way that the stiffness of the bearing support may be designed to optimize the shaft dynamics to minimize vibration and to limit critical modes from the running range of the shaft.

Referring now to FIG. 3, a cutaway view of the bearing support structure 100 of FIG. 2 is shown to illustrate inner components of said structure 100. In the embodiment shown, the structure 100 includes a casing assembly 41 and bearing support 42 that may be located radially inwardly of the inner casing 28 relative to the central axis 20. The casing assembly 41 may include the inner and outer casings 28, 26 and the struts 36. The bearing support 42 may be in abutment against an outer race of the bearing 32. It is understood that the bearing support 42 may not be in direct abutment against the outer race and that an element may be located therebetween.

The bearing support 42 may be in abutment against the inner casing 28 at a plurality of attachment points 44. In other words, the bearing support 42 may bridge at least a portion of a gap between the bearing and the inner casing 28. The bearing support 42 may be movable relative to the inner casing 28 to vary a distance D between the attachment points 44 and the struts 36 for varying a stiffness of the bearing support structure 100. The attachment points 44 may define a portion of a load transmission path from the bearings 32 to the outer casing 26. The bearing support 42 may be free of contact with the inner casing 28 between the attachment points 44. The attachment points 44 may be axially aligned with radially inner ends 36a of the struts 36. In the embodiment shown, the attachment points 44 are offset from the radially inner ends 36a of the struts 36. More specifically, the attachment points 44 are offset form the radially inner ends 36a of the struts 36 in a circumferential direction relative to the central axis 18. They may alternatively be offset in an axial direction relative to the central axis 18.

In the embodiment shown, the bearing support 42 has a plurality of radially extending members 42a protruding from a ring 42b of the bearing support 42. The attachment points 44 may be defined between distal ends 42c of the members 42a and a radially inner side of the inner casing 28. It is understood that the attachment points 44 need not be in a direct abutment against the inner casing 28 and that another element may be located therebetween. Herein, a number of the radial members 42a of the bearing support 42 corresponds to a number of the struts 36.

The portions of the inner casing 28 that are the stiffer may correspond to those that are closest to the struts 36. The inner casing 28 may be substantially unsupported between each two adjacent ones of the struts 36 and, a portion of the inner casing 28 between each two adjacent ones of the struts 36 may bend in flexion upon a load applied thereto. It may be more difficult to bend the inner casing 28 where it registers with the struts 36 because the struts 36 may increase a radial stiffness of the inner casing 28. Each of the attachment points 44 may be located between corresponding two adjacent ones of the struts 36.

In the embodiment shown, the bearing support 42 and the inner casing 28 are rotatable one relative to the other about the central axis 20 following arrow A (FIG. 4) to change the location of the attachment points 44 between the bearing support 42 and the inner casing 28. FIGS. 4-5 illustrate two possible positions of the bearing support 42 relative to the inner casing 28. In FIG. 4, the attachment points 44 between the bearing support 42 and the inner casing 28 are the closest to the struts 36. In other words, the distance D, which is a circumferential distance relative to the central axis 20, may be about 0. In FIG. 5, the attachment points 44 between the bearing support 42 and the inner casing 28 are the farthest from the struts 36. In other words, the circumferential distance may be correspond to about half of a circumferential distance between two adjacent ones of the struts 36. In FIG. 5, each of the attachment points 44 are located halfway between two adjacent ones of the struts 36. The inner casing 28 may be the least stiff at a location being centered between two struts. Consequently, the configuration of the bearing structure 100 shown in FIG. 4 may be stiffer than the one shown in FIG. 5. By having the radial members 42a of the bearing support 42 closer to the struts 36, the load transmission path between the bearing 32 (FIG. 1) and the outer casing 26 may be more direct and may substantially bypass the middle portions of the inner casing 28, which, as discussed above, are more prone to bending under stress.

It is understood that the attachment points 44 may be located anywhere between the struts 36. Moreover, although the inner casing 28 may be interrupted at locations registering with the struts 36, it is understood that, alternatively, the inner casing 28 may be continuously extending all around the central axis 20 and that the attachment points 44 may be circumferentially aligned with the struts 36. It will be appreciated that, once a location of the attachment points 44 relative to the housing 41 has been selected, the bearing support 44 may be secured to the housing 41 in a permanent manner. In other words, there is substantially no movement between the bearing support 42 and the housing 41 when the engine 10 (FIG. 1) is in operation. Hence, the stiffness of the structure 100 may be substantially constant during all flight phases of the gas turbine engine 10 (FIG. 1).

This disclosed bearing support structure may allow the stiffness of the bearing support to be modified between subsequent bearing housing builds by the movement of the separate bearing support within the housing, which includes the casings and the struts. Rotating the bearing support within the housing may bring the radial members 42a of the bearing support 42 closer to the struts, which may cause the stiffness to increase because of the relative stiffness of the bearing housing struts.

It is understood that other variations are contemplated. For instance, the bearing support may be in abutment against an inner race of a bearing. The radial members of the bearing support may be replaced by having the bearing support defining a wavy configuration with alternative crests and valleys; the crests defining the attachment points and the valleys being in abutment against the bearing. Moreover, it will be appreciated that, alternatively, the bearing support may be axially translatable relative to the casings to vary the distance between the attachment points and the struts. In such a case, the distance would be an axial distance. It will be further appreciated that the bearing support may be both axially and circumferentially movable relative to the inner casing to vary the distance between the attachment points and the struts to tune the stiffness of the bearing support structure. It will be appreciated that the casings need not define a gaspath therebetween. In other words, the bearing support structure may be an assembly located radially inwardly/outwardly of a gaspath and that may offer stiffness tuning.

In the embodiment shown, once the required stiffness is achieved, the bearing support 42 may be secured to the casing assembly 41. Herein, the bearing support 42 may be secured to the inner casing. Any suitable method, such as welding, riveting, and so on may be used to secure the bearing support 42 to the housing. The housing 41 may be made of sheet metal and the bearing support 42 may be made of sheet metal. The bearing support 42 may be made by casting or forging.

For manufacturing the bearing support structure, the bearing support 42 and the casing assembly 41 are obtained, a distance between the attachment points 44 of the bearing support 42 and the struts 36 is selected as a function of a required stiffness of the bearing support structure 100, and a position of the bearing support 42 relative to the casing assembly 41 is adjusted until the attachment points 44 are distanced from the struts 36 by the selected distance and the bearing support 42 is joined to the casing assembly 41 at the attachment points 44.

In the embodiment shown, selecting the distance includes selecting a circumferential distance D relative to the central axis 20 between the attachment points 44 and the struts 36. In the depicted embodiment, the bearing support 42 includes the ring 42b extending around the central axis 20 and the plurality of radially extending members 42a protruding from the ring 42b, the attachment points 44 are located at distal ends of the plurality of radially extending members 42a. And, joining the bearing support 42 to the casing assembly 41 includes joining the distal ends of the plurality of radially extending members 40a to the casing assembly 41. The bearing support 42 may be welded to the casing assembly 41.

In the present embodiment, one attachment point 44 is located between each two circumferentially adjacent ones of the struts 36 and moving the casing assembly 41 relative to the bearing support 42 includes rotating the bearing support 42 and the casing assembly 41 one relative to the other about the central axis 20.

The bearing support 42 may be assembled to the casing assembly 41 before moving the casing assembly 41 relative to the bearing support 42 until the attachment points 44 are distanced from the struts 36 by the selected distance D. Assembling the bearing support 42 to the casing assembly 41 may include moving the bearing support 42 relative to the casing assembly 41 in an axial direction relative to the central axis 20 until the attachment points 44 are axially aligned with the radially inner ends of the struts 36.

For adjusting the stiffness of a bearing support structure 100, operating parameters of the gas turbine engine 10 are obtained, a required stiffness of the bearing support structure 100 is determined as a function of the obtained parameters, and the distance D between the attachment points 44 of the bearing support 42 and the struts 36 is selected as a function of the determined required stiffness and the bearing support 42 is joined to the first casing at the attachment points 44. Herein, selecting the distance D includes selecting a circumferential distance relative to the central axis 20 between the attachment points 44 and the struts 36.

In a particular embodiment, the position of the bearing support 42 relative to the casing is determined by modeling the housing assembly and by performing an analytical stress and dynamic analysis to optimize the position.

Embodiments disclosed herein includes:

A. A method of manufacturing a bearing support structure of a gas turbine engine, comprising: obtaining a bearing support and a casing assembly, the casing assembly having first and second casings extending around a central axis and connected together via struts, the bearing support securable to the first casing at attachment points; selecting a distance between the attachment points of the bearing support and the struts as a function of a required stiffness of the bearing support structure; and adjusting a position of the bearing support relative to the casing assembly until the attachment points are distanced from the struts by the selected distance and joining the bearing support to the casing assembly at the attachment points.

B. A method of adjusting a stiffness of a bearing support structure of a gas turbine engine, the bearing support having first and second casings extending around a central axis and connected together via struts and having a bearing support securable to the first casing at attachment points, comprising: obtaining operating parameters of the gas turbine engine; determining a required stiffness of the bearing support structure as a function of the obtained parameters; and selecting a distance between the attachment points of the bearing support and the struts as a function of the determined required stiffness and joining the bearing support to the first casing at the attachment points.

Embodiments A and B may include any of the following elements, in any combinations:

Element 1: selecting the distance includes selecting a circumferential distance relative to the central axis between the attachment points and the struts. Element 2: the bearing support includes a ring extending around the central axis and a plurality of radially extending members protruding from the ring, the attachment points located at distal ends of the plurality of radially extending members, joining the bearing support to the casing assembly includes joining the distal ends of the plurality of radially extending members to the first casing. Element 3: joining the bearing support to the casing assembly includes welding the bearing support to the first casing. Element 4: one attachment point is located between each two circumferentially adjacent ones of the struts, moving the casing assembly relative to the bearing support includes rotating the bearing support and the casing assembly one relative to the other about the central axis. Element 5: including assembling the bearing support to the casing assembly before moving the casing assembly relative to the bearing support until the attachment points are distanced from the struts by the selected distance. Element 6: assembling the bearing support to the casing assembly includes moving the bearing support relative to the casing assembly in an axial direction relative to the central axis until the attachment points are axially aligned with radially inner ends of the struts. Element 7: selecting the distance includes selecting a circumferential distance relative to the central axis between the attachment points and the struts. Element 8: the bearing support includes a ring extending around the central axis and a plurality of radially extending members protruding from the ring, the attachment points located at distal ends of the plurality of radially extending members, joining the bearing support to the first casing includes joining the distal ends of the plurality of radially extending members to the first casing. Element 9: joining the bearing support to the first casing includes welding the bearing support to the first casing.

C. A bearing support structure for a gas turbine engine, the bearing support structure having a central axis and comprising: first and second casings extending around the central axis and being radially spaced apart from one another relative to the central axis, the first and second casings secured to one another by struts extending at least radially; and a bearing support secured to the first casing at attachment points circumferentially distributed around the central axis, the bearing support free of contact with the first casing between the attachment points.

Embodiment C may include any of the following elements, in any combinations:

Element 10: the attachment points are offset from the struts in a circumferential direction relative to the central axis. Element 11: the bearing support includes a ring extending around the central axis and radially extending members protruding from the ring, the bearing support secured to the first casing via the radially extending members. Element 12: the bearing support is welded to the first casing. Element 13: one attachment point is located between each two circumferentially adjacent ones of the struts. Element 14: a number of the struts corresponds to a number of the attachment points. Element 15: a number of the struts corresponds to a number of radially extending members. Element 16: the attachment points are axially aligned with radially inner ends of the struts. Element 17: the bearing support is located radially inwardly of the first casing.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a bearing support structure of a gas turbine engine, comprising:
    obtaining a bearing support and a casing assembly, the casing assembly having first and second casings extending around a central axis and connected together via struts, the bearing support securable to the first casing at attachment points of the bearing support;
    selecting a distance between the struts and the attachment points of the bearing support as a function of a required stiffness of the bearing support structure; and
    adjusting a position of the bearing support relative to the casing assembly until the attachment points are distanced from the struts by the selected distance and joining the bearing support to the casing assembly at the attachment points.

2. The method of claim 1, wherein selecting the distance includes selecting a circumferential distance relative to the central axis between the attachment points and the struts.

3. The method of claim 1, wherein the bearing support includes a ring extending around the central axis and a plurality of radially extending members protruding from the ring, the attachment points located at distal ends of the plurality of radially extending members, and joining the bearing support to the casing assembly includes joining the distal ends of the plurality of radially extending members to the first casing.

4. The method of claim 1, wherein joining the bearing support to the casing assembly includes welding the bearing support to the first casing.

5. The method of claim 1, wherein one attachment point is located between each two circumferentially adjacent ones of the struts, the adjusting of the position of the bearing support relative to the casing assembly includes rotating the bearing support and the casing assembly one relative to the other about the central axis.

6. The method of claim 1, including assembling the bearing support to the casing assembly before the adjusting of the position of the bearing support relative to the casing assembly until the attachment points are distanced from the struts by the selected distance.

7. The method of claim 6, wherein assembling the bearing support to the casing assembly includes moving the bearing support relative to the casing assembly in an axial direction relative to the central axis until the attachment points are axially aligned with radially inner ends of the struts.

8. A method of adjusting a stiffness of a bearing support structure of a gas turbine engine, the bearing support structure having first and second casings extending around a central axis and connected together via struts and having a bearing support securable to the first casing at attachment points, comprising:
    obtaining operating parameters of the gas turbine engine;
    determining a required stiffness of the bearing support structure as a function of the obtained parameters;
    obtaining the bearing support as a separate part from the first casing; and
    selecting a distance between the attachment points of the bearing support and the struts as a function of the determined required stiffness and joining the bearing support to the first casing at the attachment points.

9. The method of claim 8, wherein selecting the distance includes selecting a circumferential distance relative to the central axis between the attachment points and the struts.

10. The method of claim 8, wherein the bearing support includes a ring extending around the central axis and a plurality of radially extending members protruding from the ring, the attachment points located at distal ends of the plurality of radially extending members, and joining the bearing support to the first casing includes joining the distal ends of the plurality of radially extending members to the first casing.

11. The method of claim 8, wherein joining the bearing support to the first casing includes welding the bearing support to the first casing.

* * * * *